(12) United States Patent
Bonte

(10) Patent No.: US 9,585,297 B2
(45) Date of Patent: Mar. 7, 2017

(54) FLYWHEEL STARTUP SYSTEM

(71) Applicant: CNH Industrial America LLC, New Holland, PA (US)

(72) Inventor: Xavier G. J. M. Bonte, Et Sint Kruis (NL)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/784,835

(22) PCT Filed: Apr. 15, 2014

(86) PCT No.: PCT/EP2014/057607
§ 371 (c)(1),
(2) Date: Oct. 15, 2015

(87) PCT Pub. No.: WO2014/170318
PCT Pub. Date: Oct. 23, 2014

(65) Prior Publication Data
US 2016/0081258 A1 Mar. 24, 2016

(30) Foreign Application Priority Data
Apr. 15, 2013 (BE) .................................. 2013/0272

(51) Int. Cl.
*F16H 37/00* (2006.01)
*A01B 61/02* (2006.01)
*A01F 15/08* (2006.01)

(52) U.S. Cl.
CPC ........ *A01B 61/025* (2013.01); *A01F 15/0841* (2013.01)

(58) Field of Classification Search
CPC . A01B 71/063; F16D 1/00; F16D 3/26; F16D 3/32; F16C 35/063
USPC .................................................. 74/15.4, 15.82
See application file for complete search history.

(56) References Cited

U.S. PATENT DOCUMENTS

| | | | |
|---|---|---|---|
| 4,241,654 A | 12/1980 | van der Lely | |
| 4,615,238 A * | 10/1986 | Cheatum | A01F 15/0841 100/179 |
| 5,894,718 A | 4/1999 | Hawlas et al. | |
| 6,073,428 A * | 6/2000 | Diekhans | A01D 41/1274 123/352 |
| 6,474,228 B1 * | 11/2002 | Leupe | A01F 15/04 100/100 |
| 6,497,620 B1 | 12/2002 | Lohmuller et al. | |

(Continued)

FOREIGN PATENT DOCUMENTS

DE 9211256 U1 11/1992
EP 1974601 A1 10/2008

*Primary Examiner* — Toan To
(74) *Attorney, Agent, or Firm* — Patrick M. Sheldrake

(57) ABSTRACT

An agricultural baler has a flywheel that is connected via a cardan coupling to a PTO of a tractor, the cardan coupling includes a torque-limiter adapted for disengaging the flywheel from the PTO when a predetermined torque is exceeded, wherein the cardan coupling further includes a transmission switchable between a startup state and a running state, in the startup state the transmission is configured to only partially transmit rotational movement of the PTO to the flywheel while in the running state the transmission is configured to fully transmit rotational movement of the PTO to the flywheel.

10 Claims, 3 Drawing Sheets

(56) References Cited

U.S. PATENT DOCUMENTS

| | | | |
|---|---|---|---|
| 6,701,834 B2* | 3/2004 | Roth | A01F 15/0841 100/270 |
| 6,729,459 B2 | 5/2004 | Reinards et al. | |
| 6,896,613 B2 | 5/2005 | Paquet et al. | |
| 7,048,106 B2 | 5/2006 | Hou | |
| 7,399,255 B1 | 7/2008 | Johnson et al. | |
| 7,464,526 B2 | 12/2008 | Coenen | |
| 8,311,709 B2 | 11/2012 | Vanhercke et al. | |
| 8,417,426 B2* | 4/2013 | Vermeulen | A01F 15/0841 192/3.61 |
| 2002/0193164 A1 | 12/2002 | Wubbels | |
| 2003/0167939 A1 | 9/2003 | Roth | |
| 2006/0148616 A1 | 7/2006 | Ray et al. | |
| 2009/0277743 A1 | 11/2009 | Park et al. | |
| 2012/0310491 A1 | 12/2012 | Vermeulen | |
| 2013/0152805 A1* | 6/2013 | Roth | A01F 15/0841 100/35 |
| 2014/0165859 A1* | 6/2014 | O'Reilly | A01F 15/0841 100/179 |
| 2016/0000012 A1* | 1/2016 | Bonte | A01F 15/0841 700/275 |
| 2016/0000015 A1* | 1/2016 | Bonte | A01F 15/0841 56/341 |
| 2016/0003305 A1* | 1/2016 | Bonte | A01B 71/063 464/114 |
| 2016/0050850 A1* | 2/2016 | Bonte | A01F 15/0841 56/10.7 |

* cited by examiner

FLYWHEEL STARTUP SYSTEM

This application is the U.S. National Stage filing of International Application Ser. No. PCT/EP2014/057607 filed on Apr. 15, 2014 which claims priority to Belgian Application BE2013/0272 filed Apr. 15, 2013, each of which is incorporated herein by reference in its entirety.

FIELD OF THE INVENTION

The present invention relates to an agricultural baler. More particularly, the present invention relates to an improved cardan coupling for an agricultural baler.

BACKGROUND OF THE INVENTION

Agricultural balers typically comprise a flywheel. A flywheel is provided as a buffer between the continuous power supply of the tractor and the pulsed power consumption of the baler mechanics. Over the years, balers have become more and more powerful, meaning that larger bales can be compressed to a higher density. This requires a large amount of power to be transmitted from the tractor to the mechanics. Therefore, modern balers tend to have large and heavy flywheels.

A drawback from large and heavy flywheels is that it requires a lot of energy to accelerate the flywheel from a standing still state to a working state. Typically a flywheel rotates at about 1000 rpm (rotations per minute) in a conventional working state. The flywheel is typically connected to a PTO (power take off) of a tractor via a cardan coupling. Although the latest generation tractors might be constructed to be able to startup a heavy large flywheel, most older tractors don't. When such large and heavy flywheel is connected to a tractor that is not adapted to handle such flywheel, the tractor is stalled and the flywheel can not be started.

Suggestions have been made in the prior art to rotate a flywheel via a hydraulic system. However, such hydraulic systems are costly and complex in use.

It is an object of the present invention to provide an agricultural baler that is adapted to transmit high powers from PTO to the baler mechanics while preventing stalling of the tractor during startup.

SUMMARY OF THE INVENTION

To this end, the agricultural baler according to the invention comprises a flywheel that is connected via a cardan coupling connector that is provided to connected to a PTO of a tractor, so that the flywheel can be driven by the PTO, the cardan coupling comprising a torque-limiter adapted for at least partially disengaging the flywheel from the PTO when a predetermined torque is exceeded, characterized in that the cardan coupling further comprises transmission means that are switchable between a startup state and a running state, in the startup state the transmission means being configured to only partially transmit rotational movement of the PTO to the flywheel while in the running state transmission means are configured to fully transmit rotational movement of the PTO to the flywheel. In the invention, the cardan coupling comprises, besides a torque-limiter, a transmission means that is switchable between the startup state and a running state. The torque-limiter is added for security purposes to disengage when the torque transmitted through the cardan coupling exceeds a predetermined torque. The predetermined torque is chosen so that the different element in the cardan coupling are protected against overload. The transmission means are switchable between a startup state and a running state. In the running state, the transmission means fully transmit rotational movement of the PTO to the flywheel. Thereby in the running state, the transmission means is comparable to a conventional axle. In the startup state, the transmission means only partially transmit rotational movement of the PTO to the flywheel. As a result, the PTO can have a higher rotational speed than the flywheel. Since the PTO is conventionally connected to a combustion engine of the tractor, the PTO typically requires a minimum rotational speed to be able to exert a significant torque. When the transmission means are in the startup state, the PTO is allowed to have a higher rotational speed than the flywheel. As a result, the tractor is not stalled since the rotational speed can be maintained above the minimum rotational speed of the tractor. According to the invention, no expensive hydraulic systems are required for starting or powering the flywheel. Yet because of the transmission means, a flywheel can be provided in the baler that is too heavy and/or big to start via a direct connection.

Preferably the transmission means are formed as a gearbox. A gearbox typically has an input and an output shaft. The gearbox is thereby provided to adapt the rotational speed between the input and output shafts. Gearboxes can have multiple gears and can shift between the multiple gears to change the rotational speed ratio between input and output shafts.

Preferably the gearbox is a planetary gearbox. Planetary gearboxes are available in the market and are known to be reliable. Furthermore, using a planetary gearbox has as an advantage that the input shaft axis coincides with the output shaft axis so that the gearbox can be easily mounted in a cardan coupling.

Preferably, in the running state, the gearbox transmits the rotation from PTO to flywheel in a one-to-one ratio while in the startup state, the gearbox transmits the rotation from PTO to flywheel in a N-to-one ratio, whereby N is larger than 1. Thereby, the gearbox has two gears, the first gear is used in the running state and directly transmits the rotational movement of the input to the output. In the other gear, which is used in the startup state, the flywheel rotational speed is decreased with respect to the PTO rotational speed. As a result, a leverage is created for starting up and accelerating the flywheel.

Alternatively, according to another embodiment, the transmission means are formed as a clutch. A clutch has three operating stages, a disengaged state, a slipping stage, and an engaged stage. During the startup of the flywheel, the clutch can be held in the slipping stage so that the rotational movement of the PTO is only partially transmitted to the flywheel (due to the slip). In the running state, the clutch can be set in the engaged state so that the rotational movement is fully transmitted to the clutch. In this manner, the flywheel can be accelerated without the flywheel stalling the tractor.

Preferably, the clutch is fluid cooled. Particularly when accelerating heavy and big flywheels, the energy that is transmitted through the clutch is high. When the clutch is slipping during startup of the flywheel, a significant amount of heat is generated. By cooling the clutch using fluid, the heat can be efficiently abducted.

Preferably the clutch is a friction clutch. A friction clutch is known to be able to transmit high powers.

Preferably the clutch comprises multiple discs. In a multiple disc clutch, the energy that is transmitted through the clutch is divided over the multiple discs. Therefore such multiple disc clutch is advantageous when high powers are transmitted through the clutch.

Preferably in the running state, the clutch is adapted to be fully engaged so that rotation from PTO to flywheel is fully transmitted, while in the startup state the clutch is adapted to be partially engaged (allowing slipping) so that the rotation from PTO to flywheel is only partially transmitted. Via the slipping of the clutch, the tractor can be prevented from stalling.

Preferably, the torque-limiter is integrally formed within the transmission means. In the case of a gearbox, a shearing bolt can be provided in or at the gearbox that is used as a torque-limiter. In the case of a clutch, the torque-limiter can be formed by the disengaged stage of the clutch, where the PTO is disconnected from the flywheel.

Preferably, the flywheel has a predetermined rotational speed when the baler is in operation and wherein the transmission means are configured to be in the startup state when the flywheel is rotating from 0 tot 30% from the predetermined rotational speed. Preferably, the transmission means are configured to be in the startup state when the flywheel is rotating from 0 to 50% of the predetermined rotational speed. Tests have shown that the tractor only tends to stall when the rotating speed is low (0 tot 20%, 0 to 30%, or 0 to 40% of the normal rotational speed). By configuring the transmission means to be in the startup state while the rotational speed of the flywheel is low (from the point of view of the tractor), stalling of the tractor is prevented.

Preferably the transmission means are controlled by a controller that is operationally connected to the tractor. Thereby, tractor conditions and settings can be used to control the state of the transmission means. For example, when stalling of the tractor is detected (in an early stage), the transmission means can be switched to the startup state to prevent further stalling of the tractor.

Preferably the controller is provided to instruct the transmission means to switch states. Thereby, the controller can control the transmission means.

BRIEF DESCRIPTION OF THE DRAWINGS

The invention will now be described in more details with respect to the figures illustrating some preferred embodiments of the invention. In the figures.

In the figures a same reference number has been allocated to a same or analogous element.

DETAILED DESCRIPTION OF PREFERRED EMBODIMENTS

Figure 1:
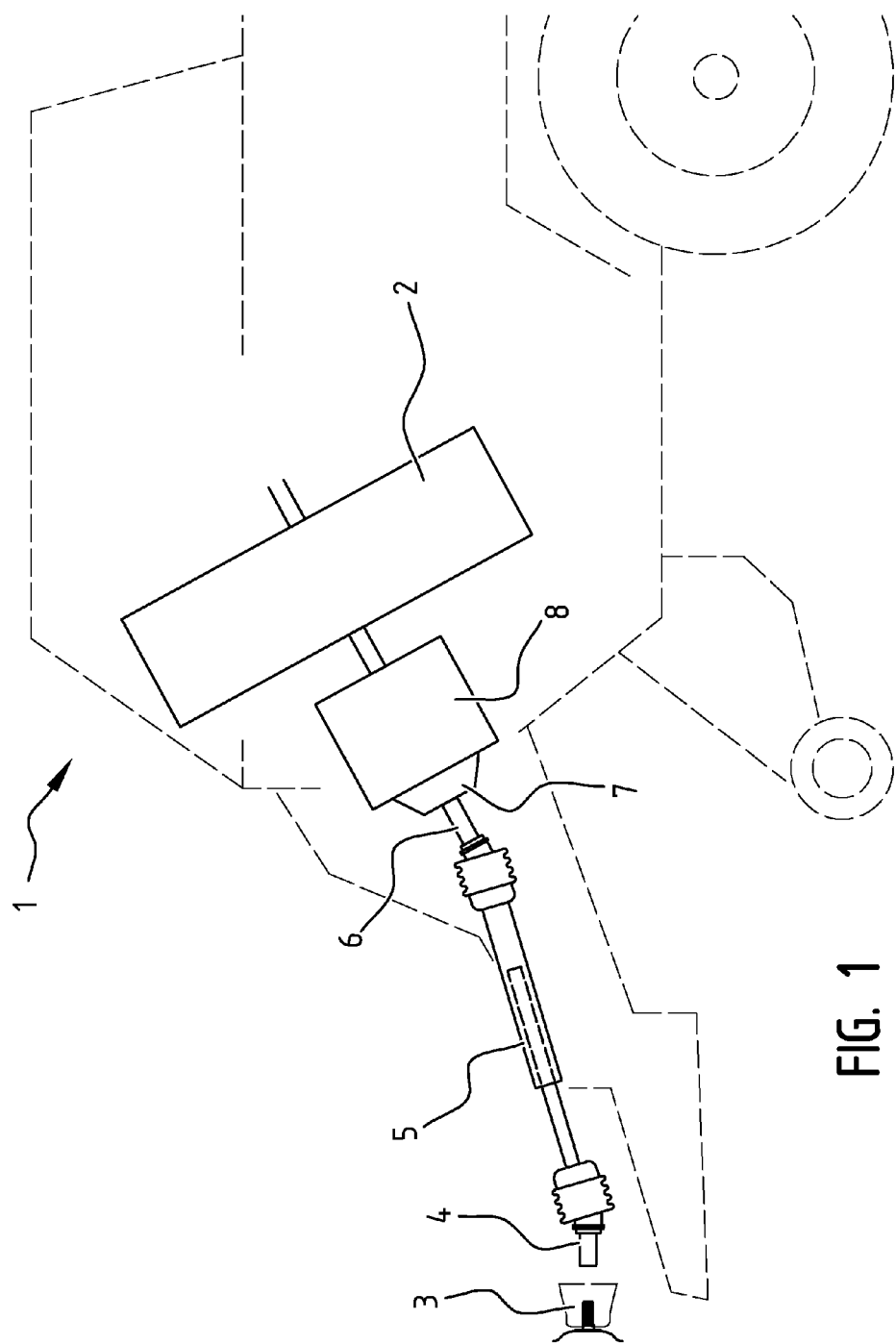
FIG. 1 shows a schematic representation of a baler having a flywheel and a cardan coupling for connecting the flywheel to the PTO of a tractor.

FIG. 1 shows a baler 1 having a flywheel 2. The flywheel 2 is connectable to the PTO 3 of a tractor. Thereby, the flywheel 2 can be driven by the PTO 3 of the tractor. To this end, the flywheel 2 is connected via a cardan coupling to the PTO 3. The cardan coupling comprises a connector 4 which is adapted to be connected to the PTO 3. Cardan coupling further comprises primary shaft 5 and a secondary shaft 6 which are mounted under an angle with respect to one another, and whereby the primary shaft is typically telescopic. The cardan coupling furthermore comprises a torque-limiter 7. The torque-limiter 7 can be formed by a shear bolt mechanism, a clutch mechanism or another torque-limiting mechanism. The cardan coupling furthermore comprises a transmission means 8 which will be further described in more detail.

The transmission means 8 are adapted to facilitate starting up the flywheel 2. In operation of the agricultural baler, the flywheel rotates at a speed of around 1000 rpm (rotations per minute). It will be clear that other rotational speeds of the baler 1 are also possible. The flywheel 2 has a high inertia. The flywheel is intended to have a high inertia for the purpose of providing the huge energy peak for the plunger & flattening out the pulsed power consumption of baler mechanisms. However, in the startup procedure of the baler, accelerating the flywheel with high inertia requires a lot of energy. In practice, when the flywheel is standing still or at very low speed, some tractors do not have the power to accelerate the flywheel 2 via a direct connection. The transmission means are provided to switch between a startup state and a running state. In the startup state, the rotation is not directly connected from PTO to flywheel. As a result, the PTO can rotate at a higher rotational speed than the flywheel 2, thereby facilitating the acceleration of the flywheel and preventing stalling of the tractor. In the running state, the transmission means do directly transmit the rotational speed from the PTO to the flywheel 2 so that a conventional operation is possible once the flywheel has been accelerated.

Figure 2:
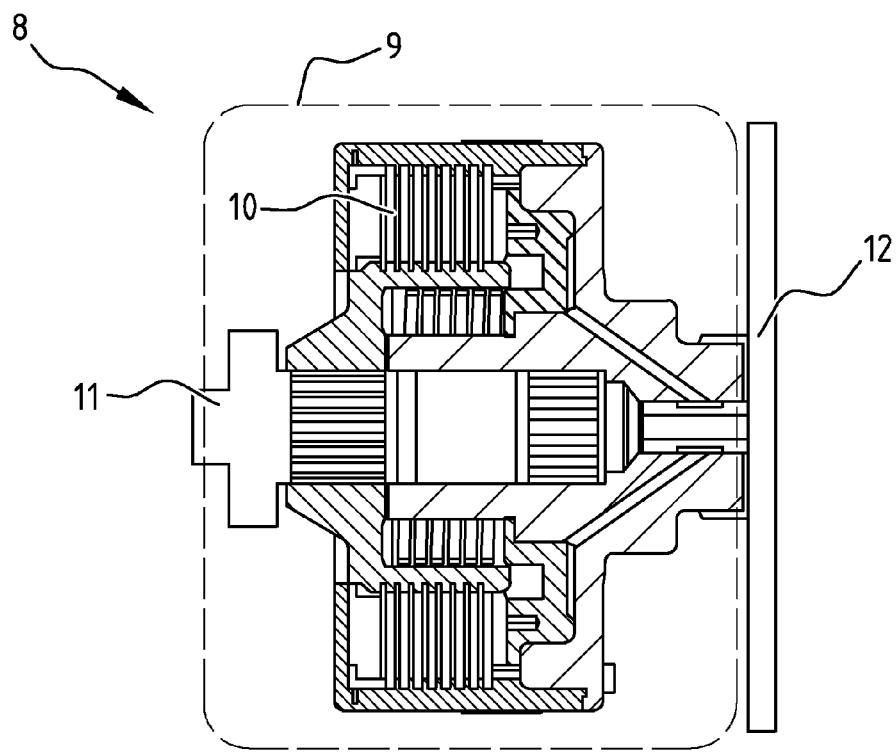
FIG. 2 shows a clutch that can be used as transmission means.

FIG. 2 shows an example of a transmission means. FIG. 2 shows a fluid cooled multiple disc clutch. The clutch is mounted in a housing 9, and shows an input shaft 11 and an output shaft 12. The output shaft 12 is connected to the flywheel 2, while the input shaft 11 is connected to the PTO 3. The clutch comprises multiple discs 10, half of the discs being connected to the input shaft 11 and the other half of the discs being connected to the output shaft 12. Thereby, the discs 10 can be compressed together by an actuator so that the discs frictionally engage with one another thereby engaging the input shaft and the output shaft 11, 12. When the actuator is released, the discs 10 disengage from one another so that the connection between the input shaft 11 and the output shaft 12 is disengaged (there is no connection). Besides the fully engaged and fully disengaged state, the clutch has a slipping state wherein the actuator partly compresses the plates 10 to one another. In the slipping state, the input shaft 11 and output shaft 12 do not rotate at the same speed and yet a torque can be transmitted from the input shaft 11 to the output shaft 12. This torque is transmitted by friction between the discs. In such slipping state, a lot of heat is generated, and therefore, the clutch is preferably fluid cooled, for example by oil. Fluid cooled multiple disc clutches are known in the art, and are therefore not further described in more detail. It will be clear to the skilled person that a dry friction clutch can also be used as transmission means, and that the invention is not limited to the clutch details.

Figure 3:
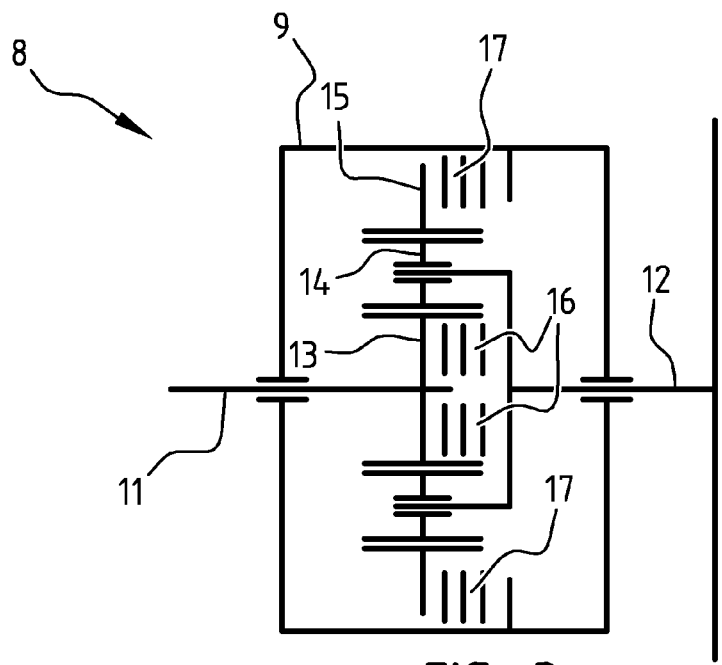
FIG. 3 shows a gearbox that can be used as transmission means.

FIG. 3 shows a gearbox that can be used as transmission means 8. The gearbox shows a housing 9 which is preferably mounted to the baler in a fixed position. The gearbox further comprises an input shaft 11 and an output shaft 12. According to the example shown in FIG. 3, the input shaft 11 is connected to the center wheel (sun gear) 13 of the planetary gearbox. The output shaft 12 is connected to the carrier of planet wheels 14 of the planetary gearbox. Planetary gearbox further comprises a ring gear 15. The planetary gearbox further comprises shift clutch for direct connection 16 and shift clutch for reduced speed 17. The shift clutch for direct connection is situated between the center wheel and the planetary wheels, to block their relative position thereby directly transmitting a rotation from the center wheel (connected to the input shaft 11) to the carrier of planet wheels 14 (which is connected to the output shaft 12), thereby directly transmitting the rotation from input shaft 11 to output shaft 12. The shift clutch for reduced speed is situated between the ring wheel 15 and the housing 9. When this shift clutch is engaged, the ring wheel stands still with respect to the housing 9, and thereby rotation of the center wheel 13 of a first rotational speed will have as a result that the carrier of plant wheels 14 will rotate at another rotational speed (which in this example is reduced with respect to the center wheel rotational speed). Thereby, rotation is transmitted at a reduced speed from input shaft 11 to output shaft 12. In the running state, the shift clutch for direct connection is engaged so that the rotational movement is transmitted from the input shaft 11 to the output shaft 12 in a one-to-one ratio. In the startup state, the rotational movement is transmitted from the input shaft 11 to the output shaft 12 in a N-to-one ratio. Thereby, the gearbox is preferably constructed so that N is situated between 1.5 and 4, more preferably between 2 and 3. It will be clear to a skilled person that although a planetary gearbox is shown in FIG. 3, other gearboxes can be used as transmission means.

Figure 4:
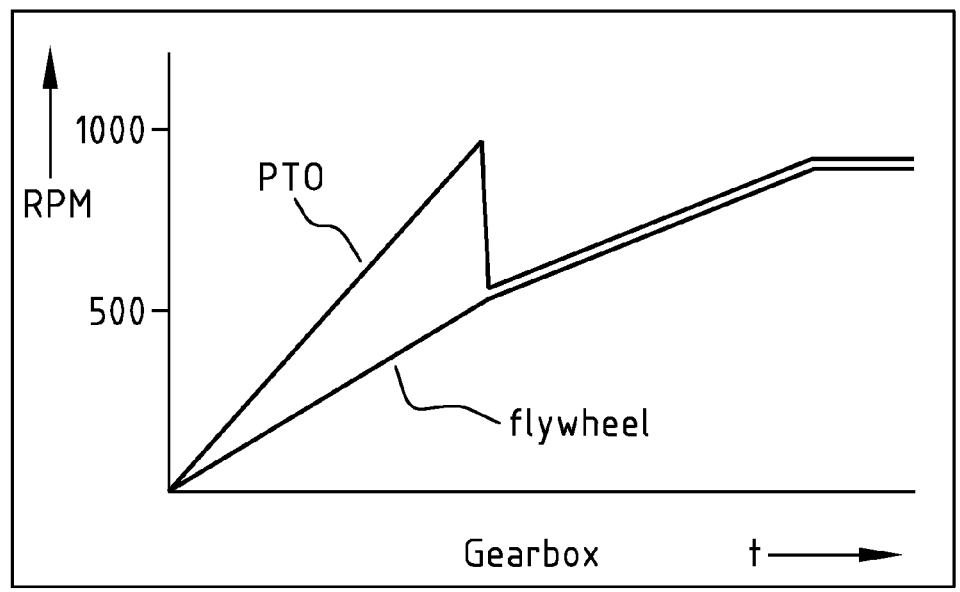
FIG. 4 shows a graph showing the startup rotation speed of PTO and flywheel with a gearbox as transmission means.

FIG. 4 shows a graph wherein the rotational speed of PTO and flywheel are shown during startup of the flywheel when a gearbox is used as transmission means. The figure shows a first section where (at the left hand side of the graph) the PTO rotational speed increases N times more than the flywheel rotational speed. This allows the PTO to quickly pick up speed so that stalling of the tractor can be prevented. Furthermore, acceleration of the flywheel is made more easy in the first stage because of the reduction effect of the gearbox. In a second stage, the gearbox shifts to a direct connection, and the flywheel and PTO show the same rotational speed. A direct connection at this point of the startup procedure typically does not negatively affect the tractor because the PTO rotational speed is brought back to the operational rotational speed divided by N (in this example around 500 rpm). At this rotational speed, the tractor already generates a significant high torque force, thereby being able to further accelerate the flywheel until it reaches the operational rotational speed (in this example 1000 rpm).

Figure 5:
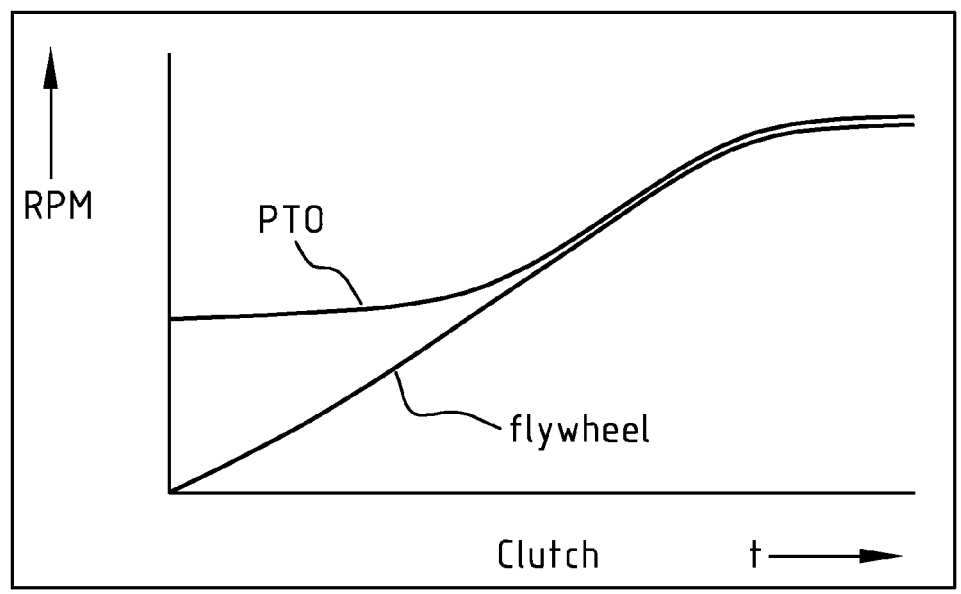
FIG. 5 shows a graph showing the startup rotation speed of PTO and flywheel when a clutch is used as transmission means.

FIG. 5 shows a similar graph showing PTO and flywheel rotational speeds during startup when a clutch is used as transmission means. The clutch is preferably so controlled that the PTO in a first stage rotates at a rotational speed that is about constant. Thereby, the rotational speed of the PTO is chosen to be a rotational speed where the tractor generates a significantly high torque force (that is higher than the flywheel rotational speed). Thereby, the clutch slips and thereby transmits the torque to the flywheel so that the flywheel can accelerate. In a second stage of the startup procedure, particularly when the flywheel reaches the predetermined rotational speed at which the PTO is maintained in the first stage, the clutch engages thereby directly transmitting the rotational movement from the PTO to the flywheel so that the flywheel can be accelerated along with the PTO rotational speed.

Preferably the torque-limiter is integrated into the transmission means. In case of the clutch, the torque-limiting function can be fulfilled by slip of the discs or by disengaging the discs of the clutch so that the input shaft 11 is disengaged from the output shaft 12. In the case of the gearbox, both the shift clutch for direct connection and shift clutch for reduced speed can slip or be opened to disengage the input shaft 11 from the output shaft 12. Thereby the torque-limiting function can be integrated into the gearbox.

The transmission means (gearbox or clutch) are preferably controlled by a controller (not shown) which is operationally connected to the tractor. This allows the startup procedure to be automated to require a minimum of attention from the operator.

The invention claimed is:

1. An agricultural baler comprising
a flywheel connected via a cardan coupling to a connector that is provided to be connected to a PTO of a tractor, so that the flywheel can be driven by the PTO; and
the cardan coupling comprising a torque-limiter adapted for at least partially disengaging the flywheel from the PTO when a predetermined torque is exceeded, the cardan coupling further comprises a transmission that is switchable between a startup state and a running state, in the startup state the transmission is configured to only partially transmit rotational movement of the PTO to the flywheel while in the running state the transmission is configured to fully transmit rotational movement of the PTO to the flywheel;
wherein the transmission is formed as a gearbox and in the running state, the gearbox transmits the rotation from PTO to the flywheel in a 1 to 1 ratio while in the startup state, the gearbox transmits the rotation from PTO to the flywheel in a N to 1 ratio, whereby N is larger than 1.

2. The agricultural baler of claim 1, wherein the gearbox is a planetary gearbox.

3. The agricultural baler according to claim 1, wherein the torque-limiter is integrally formed with the transmission.

4. The agricultural baler according to claim 1, wherein the transmission is controlled by a controller that is operationally connected to the tractor.

5. The agricultural baler according to claim 4, wherein the controller is provided to instruct the transmission to switch states.

6. An agricultural baler comprising
a flywheel connected via a cardan coupling to a connector that is provided to be connected to a PTO of a tractor, so that the flywheel can be driven by the PTO; and
the cardan coupling comprising a torque-limiter adapted for at least partially disengaging the flywheel from the PTO when a predetermined torque is exceeded the cardan coupling further comprises a transmission that is switchable between a startup state and a running state, in the startup state the transmission is configured to only partially transmit rotational movement of the PTO to the flywheel while in the running state the transmission is configured to fully transmit rotational movement of the PTO to the flywheel;
wherein the transmission is formed as a clutch and wherein in the running state, the clutch is adapted to be fully engaged so that the rotation from PTO to flywheel is fully transmitted, while in the startup state, the clutch is adapted to be engaged while allowing slipping so that the rotation from PTO to flywheel is only partially transmitted.

7. The agricultural baler according to claim 6, wherein the clutch is fluid cooled.

8. The agricultural baler according to claim 6, wherein the clutch is a friction clutch.

9. The agricultural baler according to claim 6, wherein the clutch comprises multiple disks.

10. An agricultural baler comprising
a flywheel connected via a cardan coupling to a connector that is provided to be connected to a PTO of a tractor, so that the flywheel can be driven by the PTO; and
the cardan coupling comprising a torque-limiter adapted for at least partially disengaging the flywheel from the PTO when a predetermined torque is exceeded, the cardan coupling further comprises a transmission that is switchable between a startup state and a running state, in the startup state the transmission is configured to only partially transmit rotational movement of the PTO to the flywheel while in the running state the trasmission is configured to fully transmit rotational movement of the PTO to the flywheel;
wherein the flywheel has a predetermined rotational speed when the baler is in operation, and wherein the transmission configured to be in the startup state when the flywheel is rotating from 0 to 30% from the predetermined rotational speed.

\* \* \* \* \*